United States Patent
Fujii et al.

(10) Patent No.: US 9,909,572 B2
(45) Date of Patent: Mar. 6, 2018

(54) DRIVE DEVICE

(71) Applicant: SMK Corporation, Tokyo (JP)

(72) Inventors: Katsuhito Fujii, Tokyo (JP); Takeshi Matsuda, Kanagawa (JP); Yoshinori Watanabe, Kanagawa (JP); Yuki Akita, Kanagawa (JP)

(73) Assignee: SMK Corporation, Tokyo (JP)

( * ) Notice: Subject to any disclaimer, the term of this patent is extended or adjusted under 35 U.S.C. 154(b) by 348 days.

(21) Appl. No.: 14/744,039

(22) Filed: Jun. 19, 2015

(65) Prior Publication Data

US 2015/0369222 A1 Dec. 24, 2015

Related U.S. Application Data (63) Continuation of application No. PCT/JP2014/077475, filed on Oct. 8, 2014.

(30) Foreign Application Priority Data

Jun. 20, 2014 (JP) ................... 2014-127143

(51) Int. Cl.
*F03G 7/06* (2006.01)
(52) U.S. Cl.
CPC .................... *F03G 7/065* (2013.01)
(58) Field of Classification Search
CPC .................... F03G 7/065; F03G 7/06
USPC .................... 60/527, 528; 137/468
See application file for complete search history.

(56) References Cited

U.S. PATENT DOCUMENTS

| 2009/0013684 A1 | 1/2009 | Takahashi |
| 2010/0139785 A1* | 6/2010 | Saitoh .................. F16K 31/025 137/468 |
| 2011/0000207 A1 | 1/2011 | Kume |
| 2012/0199763 A1 | 8/2012 | Lind |
| 2013/0145760 A1 | 6/2013 | Gondo |

(Continued)

FOREIGN PATENT DOCUMENTS

| JP | 2005-226456 A | 8/2005 |
| JP | 2014-37806 A | 2/2014 |
| JP | 2014037806 A * | 2/2014 |

(Continued)

OTHER PUBLICATIONS

Notice of Office Action for Japanese Patent Application No. 2014-127143, issued by the Japan Patent Office dated May 26, 2016.

(Continued)

*Primary Examiner* — Laert Dounis
*Assistant Examiner* — Kelsey Stanek (57) ABSTRACT

A drive device includes: a base member having, on a surface, an operation base part made up of one or more operation recesses; and a movable member disposed to be opposed to the base member and having, on the opposing surface, operation projections to be inserted into the operation recesses. A shape memory alloy member is interposed between the base member and the movable member, and the movable member is moved so as to be separated away from the base member in response to the contraction of the shape memory alloy member when energized. The drive device includes a spring which is supported by the base member and bias the movable member so as to be separated away from the base member.

4 Claims, 11 Drawing Sheets

(56) References Cited

U.S. PATENT DOCUMENTS

2014/0183220 A1  7/2014  Butera et al.

FOREIGN PATENT DOCUMENTS

| JP | 2014-55527 A | 3/2014 |
| JP | 2014-88811 A | 5/2014 |
| JP | 2014-88818 A | 5/2014 |

OTHER PUBLICATIONS

International Search Report for International Patent Application No. PCT/JP2014/077475, issued by the Japan Patent Office dated Jan. 6, 2015.
Extended European Search Report for European Patent Application No. 14868727.0, issued by the European Patent Office dated Oct. 16, 2017.

* cited by examiner

DRIVE DEVICE

CROSS REFERENCE TO RELATED APPLICATION

The contents of the following Japanese and PCT patent application are incorporated herein by reference,
NO. 2014-127143 filed on Jun. 20, 2014, and
NO. PCT/JP2014/077475 filed on Oct. 8, 2014.

FIELD

The present invention relates to a drive device which employs a shape memory alloy to be mainly used, for example, for vibration generating actuators.

BACKGROUND

A drive device for performing a driving operation with the help of the property of a shape memory alloy is conventionally known (for example, see Patent Literature 1). Here, the property allows the alloy to contract when heated to a temperature equal to or greater than a certain temperature (operation temperature) by energization even if the alloy has been subjected to force and distorted.

This drive device includes: an insulating base member having an operation base part made up of one or more operation recesses on the upper surface; and a movable member which is opposed to the base member and has, on the opposing surface, operation projections to be inserted into the operation recesses. Between the opposing surfaces, a shape memory alloy material which is contracted by heat generated when energized is disposed while being curved to fit into the operation recesses of the base member.

Furthermore, the drive device includes biasing means for biasing the movable member toward the base member and is configured such that when de-energized, the movable member is pushed against the base member and the movable member is thereby overlapped with the base member. This is followed by the operation projections being brought into contact with the shape memory alloy material.

Then, when the shape memory alloy line is energized so as to be heated from that state to a temperature equal to or greater than a certain temperature, the super-elasticity causes the shape memory alloy line to be contracted and the movable member to be relatively moved when pushed by the shape memory alloy material so as to be separated away from the base member.

On the other hand, when the shape memory alloy line is de-energized and the temperature of the shape memory alloy line is lowered to a temperature equal to or less than a certain temperature, the movable member is returned to the original position when the movable member is pushed by the biasing means toward the base member. This is followed by each shape memory alloy line being returned to a curved shape (the shape when de-energized).

CITATION LIST

Patent Literature

Patent Literature 1: Japanese Patent Application Laid-Open No. 2005-226456

SUMMARY

Technical Problem

However, with the conventional drive device like the aforementioned one, there was a problem that since the biasing means biases the movable member toward the base member, the movement (actuation) of the movable member requires the force against the biasing force by the biasing means in addition to the load from the housing, thereby placing a heavy load on the shape memory alloy member.

Furthermore, with the conventional drive device of this type, there was also a problem that since the biasing means biases the movable member toward the base member, the initial speed at which the drive device is actuated from a complete stop is reduced, and the responsivity from the stopping state to the start of operation is inhibited.

On the other hand, when the drive device of this type is implemented, the distance between the mounting board on which the drive device is implemented and an object to be driven by the drive device may exceed the total height of the drive device due to tolerance when de-energized. In this case, there is a possibility that a slight gap may be created between the pressing surface of the movable member and the driven object.

Upon actuation of the drive device, there is a possibility that such a slight gap created in this manner may lead to a state in which the drive force by the drive device cannot be transferred to the driven object by that gap, i.e., the so-called empty shot, causing an unusual noise or the like.

In this context, the present invention has been devised in view of such conventional problems. It is therefore an object of the invention to provide a drive device which employs a shape memory alloy member; reduces load to the shape memory alloy member; has an outstanding initial operation performance; and can implement a movable member and a driven object without any gap.

Solution to Problem

One aspect of the invention for solving the aforementioned conventional problems and achieving the intended object has a feature, i.e., a drive device including: a base member having, on a surface, an operation base part made up of one or more operation recesses; and a movable member disposed to be opposed to the base member and having, on an opposing surface, operation projections to be inserted into the operation recesses. The drive device is configured such that a linear or belt-shaped shape memory alloy member which is contracted by heat generated when energized is interposed between the base member and the movable member; and the movable member is moved so as to be separated away from the base member in response to the contraction of the shape memory alloy member when energized, the drive device including a spring which is supported by the base member and which biases the movable member so as to be separated away from the base member.

In addition to the configuration in one aspect of the invention, the drive device has a feature that the base member includes spring supports at sides of the operation base part; the movable member includes a flange-shaped push-up part which is opposed to an upper surface of the spring supports; and the spring is interposed between the supports and the push-up part.

In addition to the configuration in one aspect of the invention, the drive device has a feature that the spring includes a spring base part to be inserted into a guide hole opened at both ends of the spring supports, and a spring body which allows both the ends to be supported between both the spring base parts and which is curved so as to be formed in an arc shape that is projected toward the push-up part, and at least any one of the guide holes is formed in the shape of an elongated hole groove.

In addition to the configuration in one aspect of the invention, the drive device has a feature that the spring includes a spring body which has ends movably retained by the movable member and which is curved in the shape of an arc projected toward the spring supports, and an arc-shaped top of the spring body is brought into contact with the upper surface of the spring supports.

In addition to the configuration in one aspect of the invention, the drive device has a feature of including a bracket for allowing the base member to movably retain the movable member.

As described above, the drive device in one aspect of the invention includes: a base member having, on a surface, an operation base part made up of one or more operation recesses; and a movable member disposed to be opposed to the base member and having, on the opposing surface, operation projections to be inserted into the operation recesses. The drive device is configured such that a linear or belt-shaped shape memory alloy member which is contracted by heat generated when energized is interposed between the base member and the movable member; and the movable member is moved so as to be separated away from the base member in response to the contraction of the shape memory alloy member when energized. In this configuration, the drive device includes a spring which is supported by the base member and which biases the movable member so as to be separated away the base member. This configuration can alleviate the load on the shape memory alloy member and provide improved initial operation performance and responsivity. It is also possible to readily mount the drive device between the movable member and an object to be driven such as an electronic appliance housing without causing any gap.

Furthermore, in one aspect of the invention, the base member includes spring supports at the sides of the operation base part, the movable member includes a flange-shaped push-up part which is opposed to the upper surface of the spring supports; and the spring is interposed between the support and the push-up part. This allows the spring to bias the movable member without inhibiting the push-up operation by the shape memory alloy material.

Furthermore, in one aspect of the invention, the spring includes a spring base part to be inserted into a guide hole opened at both ends of the spring supports, and a spring body which allows both the ends to be supported between both the spring base parts and which is curved so as to be formed in an arc shape that is projected toward the push-up part, and at least any one of the guide holes is formed in the shape of an elongated hole groove. This configuration can smoothly operate the spring.

Still furthermore, the spring includes a spring body which has ends movably retained by the movable member and which is curved in the shape of an arc projected toward the spring supports, and the arc-shaped top of the spring body is brought into contact with the upper surface of the spring supports. This configuration can smoothly operate the spring and integrate the movable member and the spring.

Furthermore, the aspect of the invention includes a bracket for allowing the base member to movably retain the movable member. This configuration can prevent the movable member from being dislodged even when the movable member is being biased by the spring so as to be separated away from the base member.

DESCRIPTION OF EMBODIMENTS

Now, in accordance with an embodiment shown in FIG. 1 to FIG. 8B, a description will be made to a mode of implementation of a drive device according to the present invention. Note that in this embodiment, a drive device to be used for a vibration generating actuator will be illustrated by way of example, a reference numeral 1 in the figures denotes the drive device, a symbol A denotes a mounting board, and a symbol B denotes a housing of an electronic appliance serving as an object to be driven.

The drive device 1 includes a base member 3 having an operation base part 32 made up of one or more operation recesses 31, 31, . . . on a surface, and a movable member 4 which is disposed to oppose the base member 3 and has operation projections 41, 41 . . . that are inserted into the operation recesses 31 on the opposite side. The drive device 1 is configured such that a linear or belt-shaped shape memory alloy member 2 that is contracted by heat generated when energized is interposed between the base member 3 and the movable member 4, and the movable member 4 is moved so as to be separated away from the base member 3 in response to the contraction of the shape memory alloy member 2 when energized.

Furthermore, the drive device 1 includes springs 7 and 7 supported by the base member 3 and is configured such that the movable member 4 is biased by the springs 7 and 7 so as to be separated away from the base member 3.

Furthermore, the drive device 1 includes terminal brackets 5 and 5 which are fitted over the respective ends of the base member 3 to secure the ends of the shape memory alloy member 2 to the base member 3, and is configured to energize the shape memory alloy member 2 via the terminal brackets 5 and 5.

The shape memory alloy member 2 includes a shape memory alloy line 21 made of an alloy exhibiting the shape memory effect such as a nickel-titanium alloy, that is, a shape memory alloy, and a belt-shaped sheath member 22 that covers the outside of the shape memory alloy line 21. Even when deformed at a predetermined temperature, the shape memory alloy line 21 is configured to be contracted due to heat generated when the shape memory alloy line 21 is energized.

Figure 1A:
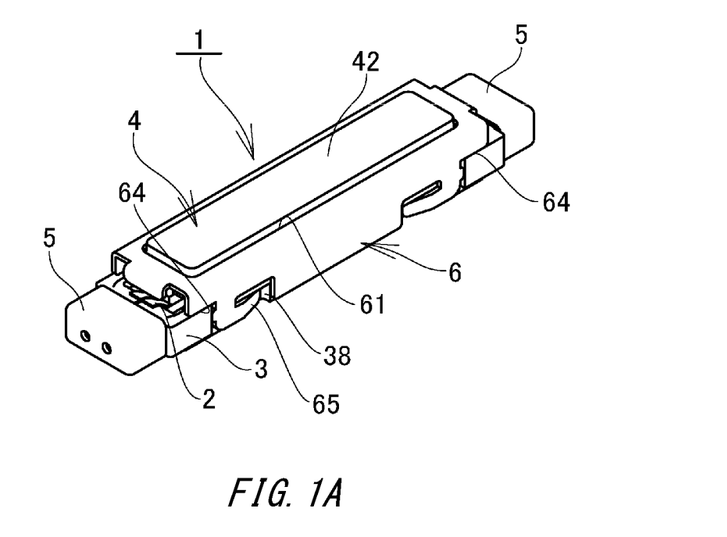
FIG. 1A is a perspective view illustrating an example of a drive device according to the present invention.
Figure 1B:
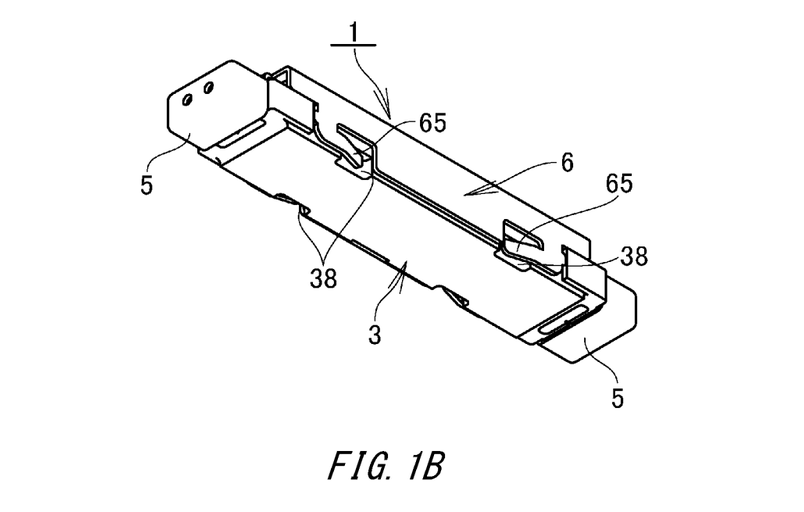
FIG. 1B is a perspective view illustrating an example of a drive device according to the present invention.
Figure 2:
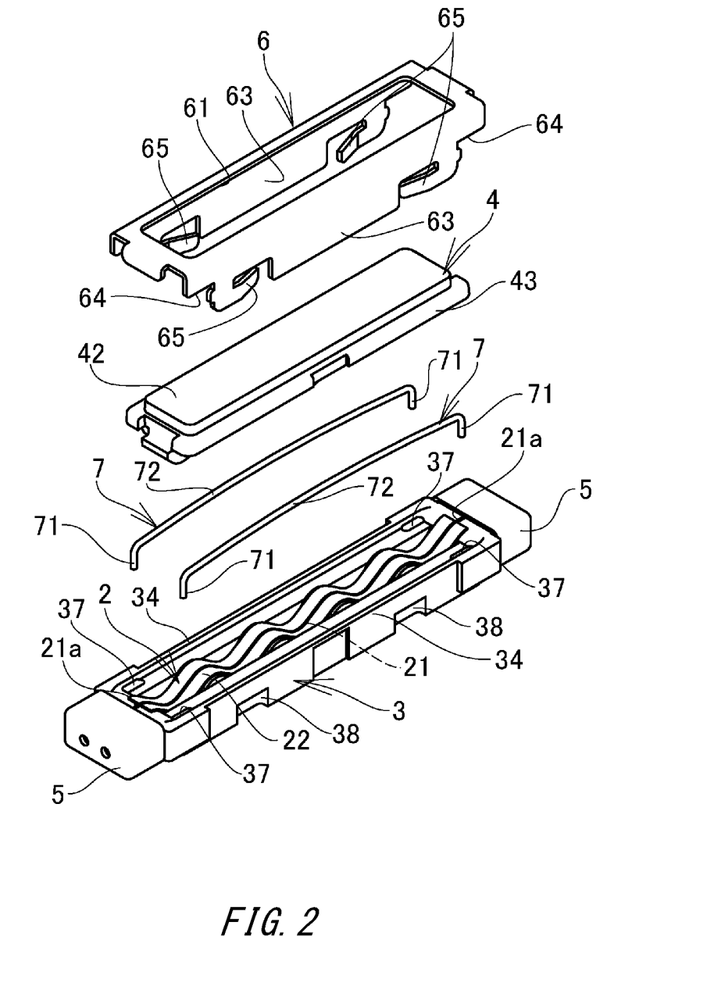
FIG. 2 is an exploded perspective view illustrating the drive device above.
Figure 3A:
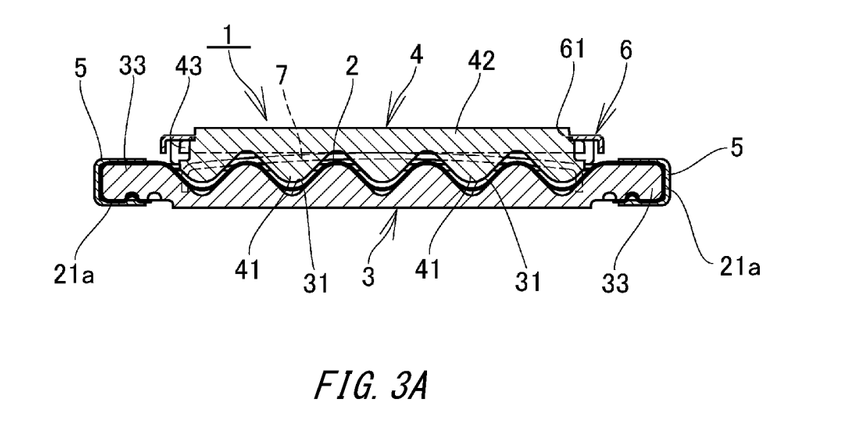
FIG. 3A is a longitudinal sectional view illustrating the operational part of the drive device above.
Figure 3B:
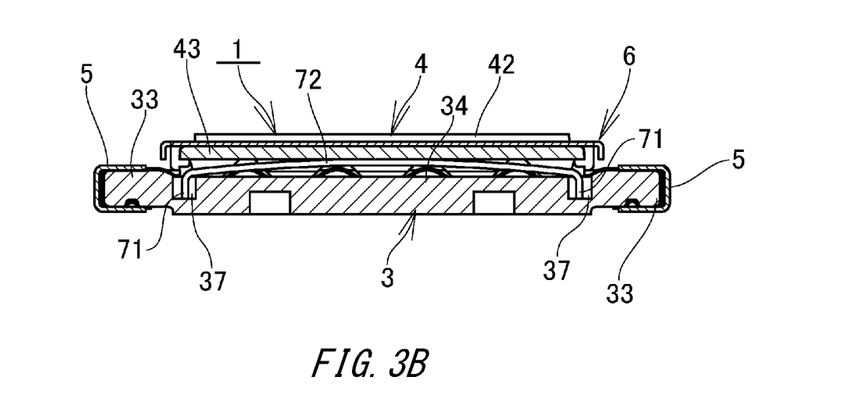
FIG. 3B is a cross-sectional view illustrating a spring part of the drive device.

As shown in FIGS. 3A and 3B, the base member 3 includes: the operation base part 32 which is integrally formed of an insulating resin such as an insulating resin containing ceramic powder granules (hereafter referred to as the ceramic resin) and has a plurality of operation recesses 31, 31 . . . on a surface; terminal securing parts 33 and 33 disposed at both ends of the operation base part 32; and rib-shaped spring supports 34 and 34 erected on both sides of the operation base part 32.

The operation base part 32 is configured such that a plurality of support projections 35, 35 . . . mountain-shaped in cross-section are continually disposed in the longitudinal direction and formed in a wave shape in cross section; the wave-shaped valley parts constitute each of the operation recesses 31, 31 . . . ; the shape memory alloy member 2 is disposed between both the terminal securing parts 33 and 33 so as to traverse the operation base part 32 in the longitudinal direction; and both ends thereof are secured to the terminal securing parts 33 and 33 by the terminal brackets 5 and 5, respectively.

The spring supports 34 and 34 are formed in a rib shape which has a certain width and is integrated with the side of the operation base part 32 and close the side opening of the operation recesses 31, 31 . . . .

The spring supports 34 and 34 are provided with guide holes 37 and 37 formed to be opened on the upper surface at both ends in the longitudinal direction; and spring base parts 71 and 71 of the spring body 7 are inserted into the guide holes 37 and 37 so as to support the spring body 7 by the spring supports.

The spring body 7 includes: the pin-shaped spring base parts 71 and 71 which are formed by bending an elastic metal wire rod and inserted into the guide holes 37; and an arc-shaped spring body 72 that is supported at both the ends between the spring base parts 71 and 71 and projected toward the movable member 4.

The guide holes 37 and 37 of the spring support 34 are formed in the shape of an elongated hole groove that is longer in the longitudinal direction of the spring body 7 and the spring base part 71 can be moved while being guided in response to the elastic deformation of the spring body 72.

The terminal securing parts 33 and 33 are formed in the shape of a flat plate and configured such that the ends 21*a* of the shape memory alloy line 21 are folded from the front surface of the terminal secured part 33 to the rear surface via the end and the terminal brackets 5 and 5 are fitted over the outside thereof, thereby securing the ends 21*a* of the shape memory alloy line 21.

The terminal brackets 5 and 5 are formed in the shape of a square tube cap with one end closed by drawing an electrically conductive metal material. The terminal brackets 5 and 5 are fitted over the terminal securing parts 33 and 33, whereby the ends of the shape memory alloy member 2 are secured to the terminal securing parts 33 and 33 and connected to the terminal brackets 5 and 5.

Furthermore, the rear surface of the terminal securing parts 33 and 33 is provided with a swaging groove 36 which is oriented in a direction intersecting the longitudinal direction of the base member 3. The rear surface of the terminal brackets 5 and 5 is swaged in alignment with the swaging groove 36, whereby the ends of the shape memory alloy member 2 are secured to the terminal securing parts 33 and 33 with reliability and the state of stable connection between the terminal brackets 5 and 5 and the shape memory alloy member 2 is ensured.

Figure 4A:
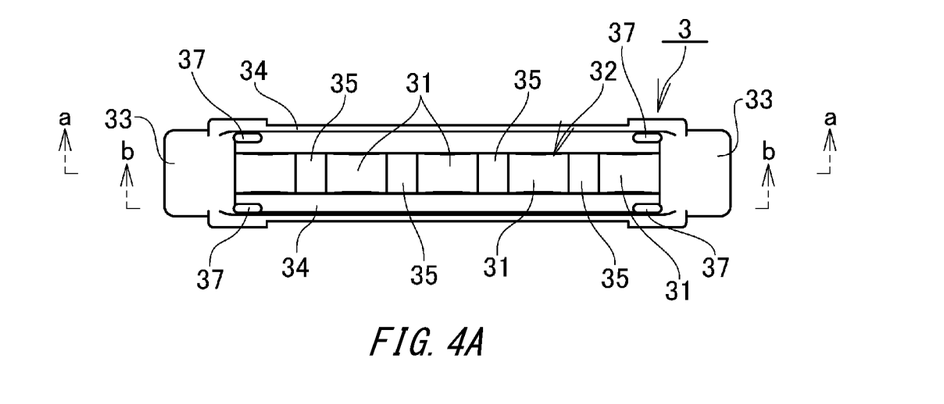
FIG. 4A is a plan view illustrating a base member in FIG. 2.
Figure 4B:
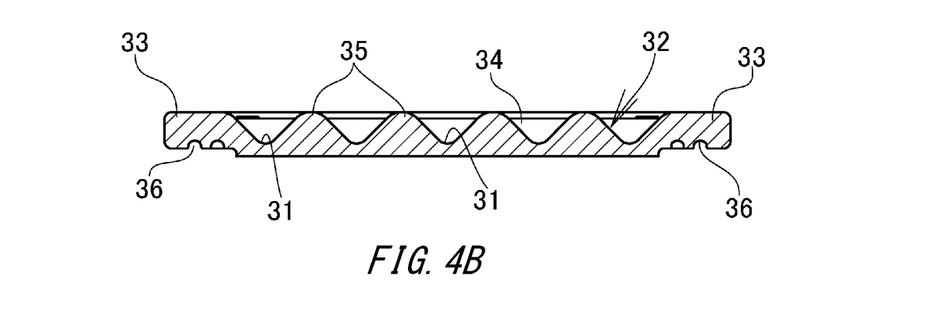
FIG. 4B is a cross-sectional view taken along line a-a.
Figure 4C:
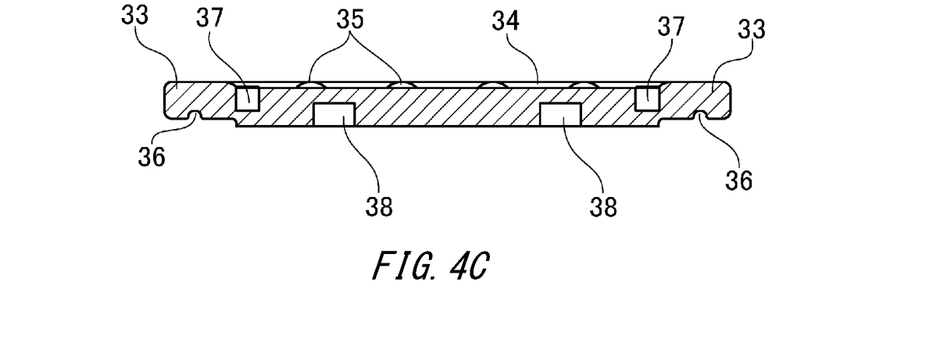
FIG. 4C is a cross-sectional view taken along line b-b.

On the other hand, as shown in FIGS. 4A and 4B, like the base member 3, the movable member 4 is integrally formed of an insulating resin such as an insulating resin containing ceramic powder granules (ceramic resin).

The movable member 4 includes a plurality of mountain-shaped operation projections 41, 41 . . . , which are inserted into the respective operation recesses 31, 31 . . . of the base member 3, on the side opposing thereto. The movable member 4 is superimposed with the base member 3, whereby the operation projections 41, 41 . . . are fitted into the respective operation recesses 31, 31 . . . , and the shape memory alloy member 2 disposed between the opposing surfaces of the movable member 4 and the base member 3 is deformed in the shape of waves according to the fitting surface of the operation projections 41, 41 . . . .

Furthermore, the movable member 4 is configured such that the side of the operation projections 41 and 41 is guided along the inner side of the spring support 34, so that the movable member 4 is operated with stability in the vertical direction and variations in acceleration are reduced.

The movable member 4, which includes a transfer part 42 having a flat contact surface on the top end, is configured such that the transfer part 42 can be vertically passed through an insertion window 61 that is opened on the upper surface of a bracket 6.

Furthermore, the outer periphery of the movable member 4 is provided integrally with a flange-shaped push-up part 43. The push-up part 43 is stopped when brought into contact with the outer edge of the insertion window 61 of the bracket 6, and the lower surface of the push-up part 43 is pushed upwardly by the springs 7 and 7.

Figure 6A:
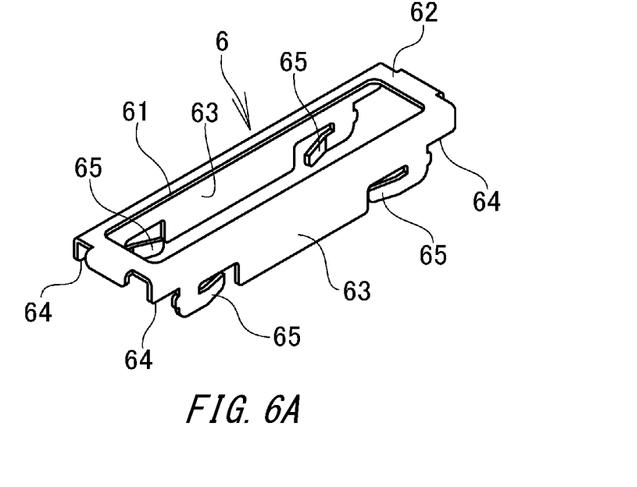
FIG. 6A is a perspective view illustrating a bracket in FIG. 2.
Figure 6B:
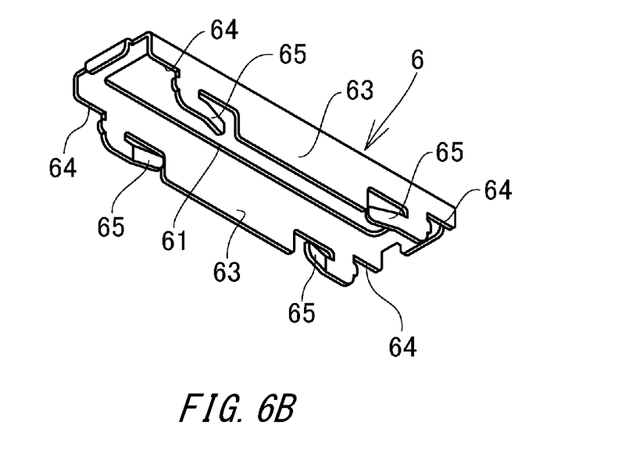
FIG. 6B is a perspective view illustrating a bracket in FIG. 2.

As shown in FIGS. 6A and 6B, the bracket 6 is integrally formed by punching and then bending an electrically conductive metal plate-shaped material so as to include a flat-plate-shaped top plate 62 and a pair of side plates 63 and 63 that are bent downwardly from both side edges of the top plate 62.

The side plates 63 and 63 are formed in the shape of a plate having an inverted projection with steps formed at both ends in the longitudinal direction, and are configured such that the steps 64 and 64 are supported on the upper surface of the base member 3.

Furthermore, the side plate 63 is cut and raised to be integrally provided with locking pawls 65 and 65, and the locking pawls 65 and 65 are inwardly bent so as to be engaged with locking recesses 38 formed on the side of the base member 3, thereby allowing the bracket 6 to be secured to the base member 3 so as not to be detachable therefrom.

As shown in FIGS. 3A and 3B, when not mounted on an electronic appliance, the drive device 1 constructed in this manner is configured such that the movable member 4 is biased by the springs 7 and 7 supported by the base member 3 so as to be separated away from the base member 3, and the operation projections 41 and 41 of the movable member 4 are floated from the operation recesses 31, 31 . . . of the base member 3 and the shape memory alloy member 2 that is curved in a waveform.

Figure 7A:
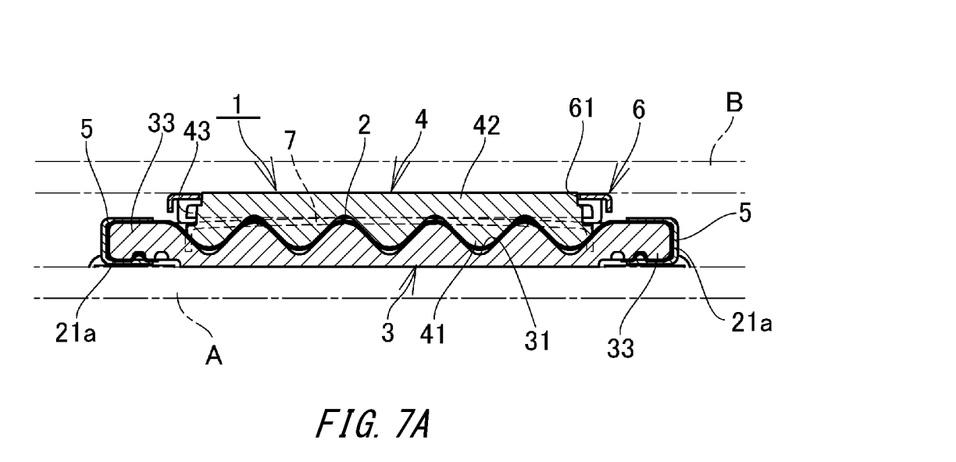
FIG. 7A is a longitudinal sectional view illustrating the mode of use of the drive device when de-energized, the view illustrating the state of the shape memory alloy member.

As shown in FIG. 7A, to mount the drive device 1, while the upper surface of the movable member 4 is pushed against a housing B and the movable member 4 is pushed down toward the base member 3 against the biasing force of the springs 7 and 7, the drive device 1 is set up between the mounting board A and the housing B of the electronic appliance.

Figure 7B:
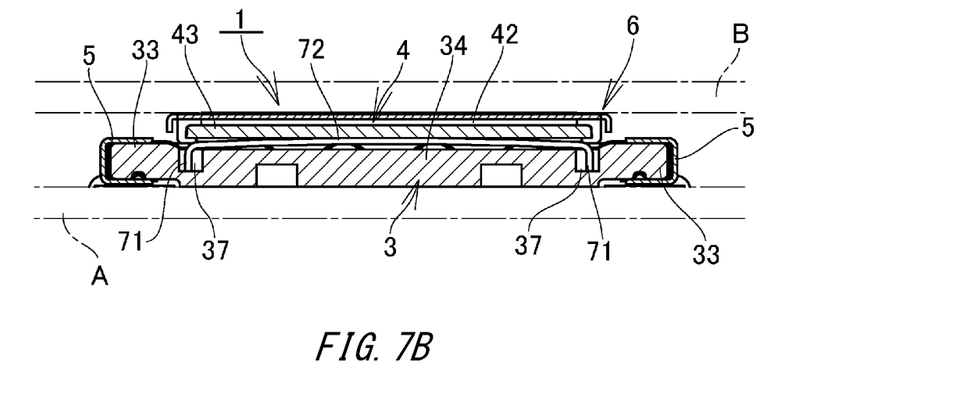
FIG. 7B is a longitudinal sectional view illustrating the mode of use of the drive device when de-energized, the view illustrating the state of the spring body.

At that time, as shown in FIG. 7B, the springs 7 and 7 are elastically deformed in the direction in which the spring body 72 is elongated while the spring base parts 71 and 71 are guided in the guide holes 37 and 37; the movable member 4 is superimposed on the base member 3; the operation projections 41, 41 . . . are each inserted into the operation recesses 31, 31 . . . ; and the top of the operation projections 41, 41 . . . is brought into close proximity to each shape memory alloy member 2 that is deformed in a wave shape (the shape when de-energized.)

Furthermore, the movable member 4 is always kept being pushed against the housing B by the biasing force (spring reactive force) of the springs 7 and 7 supported by the base member 3. Thus, the drive device 1 can be mounted so as to accommodate, by the springs 7 and 7, the influences of the tolerance between the mounting board A and the electronic appliance housing B and the tolerance of the drive device 1 itself and so as not to cause a gap between the movable member 4 and the housing B serving as a driven object.

Thus, a slight gap made between the movable member 4 and the housing B serving as an object to be driven allows the drive device 1 to prevent the state in which the drive force by the drive device is not transferred to the driven object by the gap, or the so-called empty shot.

Figure 8A:
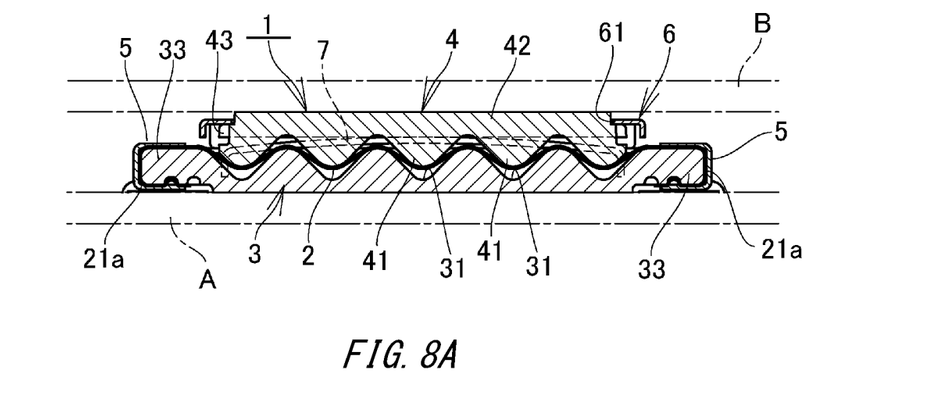
FIG. 8A is a longitudinal sectional view illustrating the mode of use of the drive device when energized, the view illustrating the state of the shape memory alloy member.
Figure 8B:
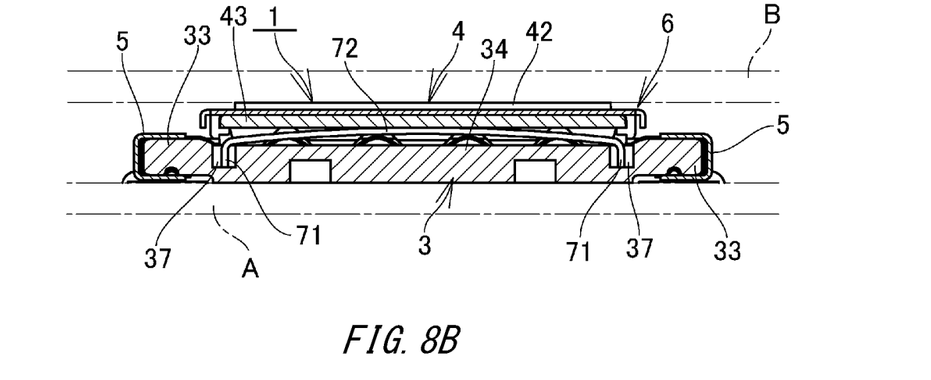
FIG. 8B is a longitudinal sectional view illustrating the mode of use of the drive device when energized, the view illustrating the state of the spring.

On the other hand, when the drive device 1 is energized, that is, a voltage is applied between the terminal brackets 5 and 5 to thereby allow a current to flow through the shape memory alloy member 2, the shape memory alloy member 2 is contracted by the shape memory alloy effect, that is, the heat generation due to energization. Then, as shown in FIGS. 8A and 8B, a portion of the shape memory alloy member 2, which is in contact with the top of the operation projections 41, 41 . . . , in the direction of the opposing surfaces is displaced toward the movable member 4, and in response thereto, the movable member 4 is pushed up by the shape memory alloy member 2 via the operation projections 41, 41 . . . and relatively moved so as to be separated away from the base member 3, thereby pushing up the electronic appliance housing B.

At that time, the movable member 4 is biased by the springs 7 and 7 so as to be pushed up, whereby the movable member 4 is subjected to the biasing force exerted by the springs 7 and 7 in addition to the actuation force (push-up force) provided by the shape memory alloy member 2. Thus, the load to the shape memory alloy member 2 is reduced, causing no hindrance to the actuation force.

Furthermore, the biasing force by the springs 7 and 7 is added to the push-up force by the shape memory alloy member 2. This will cause an increase in the push-up force against the load exerted from the housing B, an improvement in the initial speed of the movable member 4, and an improvement in the responsivity until the movable member 4 is operated.

Figure 5A:
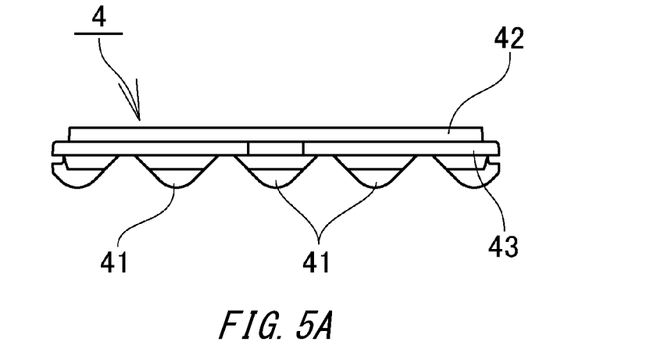
FIG. 5A is a front view illustrating a movable member in FIG. 2
Figure 5B:
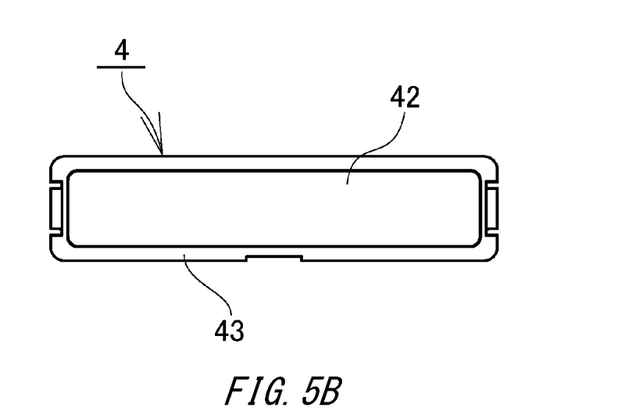
FIG. 5B is a plan view of the movable member.
Figure 5C:
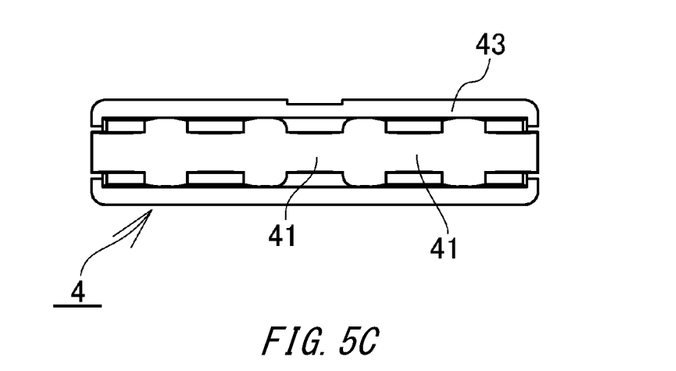
FIG. 5C is a bottom view of the movable member.

Then, when the voltage applied between the terminal brackets 5 and 5 is removed, the load or the like applied by the electronic appliance housing B causes the movable member 4 to return, against the biasing force of the springs 7 and 7, to the original position shown in FIG. 5A, that is, the position at which the movable member 4 is superimposed to the base member 3. This is followed by each of the operation projections 41, 41 . . . being inserted into the operation recesses 31, 31 . . . , so that the shape memory alloy member 2 is returned to the wave shape (the shape when de-energized) by being pushed by the operation projections 41, 41 . . . .

Figure 9:
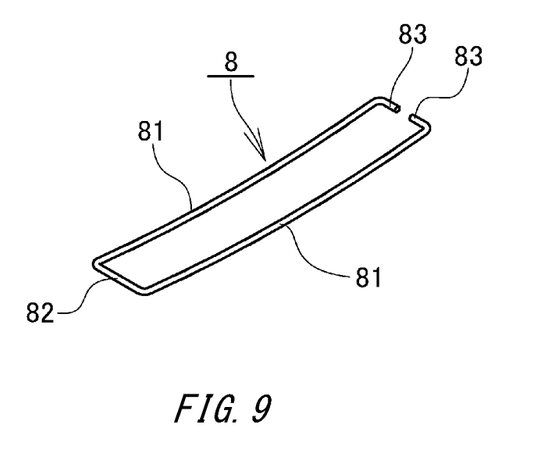
FIG. 9 is a perspective view illustrating another mode of the spring body of the drive device according to the present invention.
Figure 10:
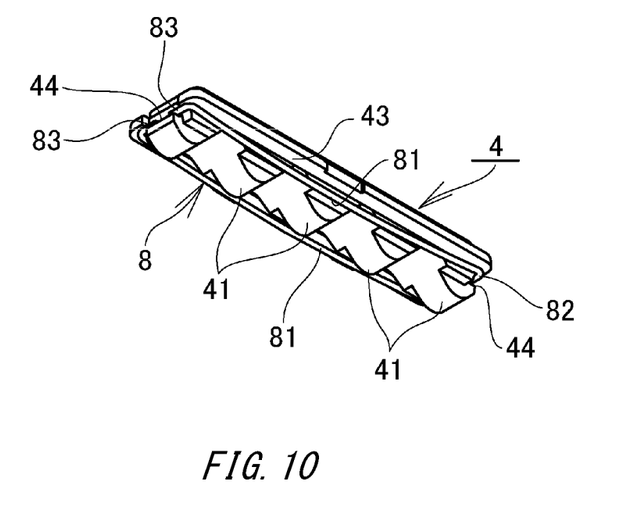
FIG. 10 is a perspective view illustrating the state of the spring body above being mounted on the movable member.
Figure 11:
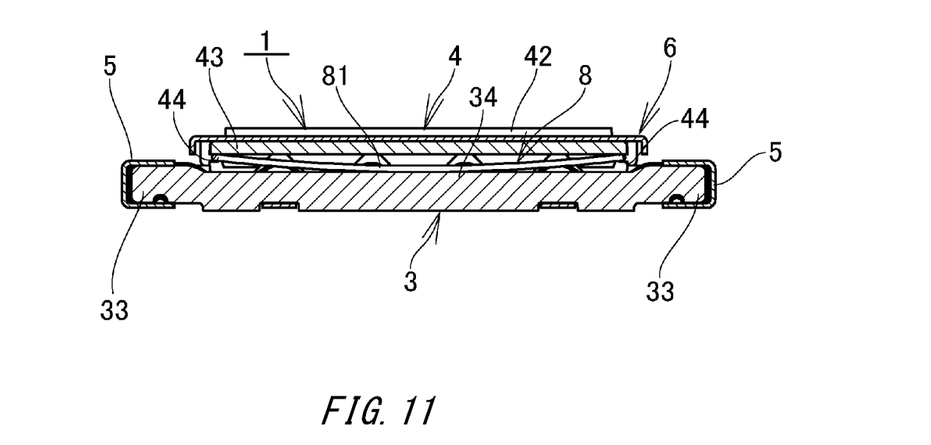
FIG. 11 is a longitudinal sectional view illustrating the operational part of the drive device above, the cross-sectional view illustrating the spring part of the drive device.

Note that the mode of the spring is not limited to the aforementioned shape; for example, those that are shown in FIG. 9 to FIG. 11 may also be employed. Note that the same components as those of the aforementioned embodiment will be given the same symbols and will not be repeatedly described.

This spring 8 is integrally formed by bending an elastic metal wire rod and includes: a pair of spring bodies 81 and 81 curved in the shape of an arc; a coupling retaining part 82 for coupling between one ends of both the spring bodies; and movable retaining parts 83 and 83 protruded inwardly from the other end of both the spring bodies. The coupling retaining part and the movable retaining parts are movably held in retaining grooves 44 formed at both ends of the movable member 4 in the longitudinal direction, respectively, thereby allowing the spring bodies 81 and 81 to be mounted to the movable member 4 so as to form an arc shape projected toward the spring support 34.

Then, as shown in FIG. 11, with the arc-shaped top of the spring body being pushed against the upper surface of the spring support 34, the movable member 4 is retained by the base member 3, whereby the spring 8 is supported by the spring support 34 to bias the movable member 4 so that the movable member 4 is separated away from the base member 3.

Furthermore, the mode of the bracket 6 is not limited to the aforementioned embodiment, and for example, the locking pawl may be projected from the lower edge of a side plate 63, and the locking pawls may be folded inwardly so as to be engaged with the lower surface of the base member 3.

Furthermore, the drive device 1 according to the present invention is not limited to the vibration generating actuator but may also be employed for another application.

REFERENCE SIGNS LIST

A mounting board
B housing
1 drive device
2 shape memory alloy member
21 shape memory alloy line
22 sheath member
3 base member
31 operation recess
32 operation base part
33 terminal securing part
34 spring support
35 support projection
36 swaging groove
37 guide hole 4 movable member
41 operation projection
42 transfer part
43 flange part
5 terminal bracket
6 bracket
61 insertion window
7 spring
71 spring base part
72 spring body
8 spring
81 spring body
82 coupling retaining part
83 movable retaining part

The invention claimed is:

1. A drive device comprising:

a base member having, on a surface, an operation base part made up of one or more operation recesses;

a movable member disposed to be opposed to the base member and having, on an opposing surface, operation projections to be inserted into the one or more operation recesses, the drive device configured such that a linear or belt-shaped shape memory alloy member which is contracted by a heat is interposed between the base member and the movable member, and the movable member is moved so as to be separated away from the base member in response to the contraction of the shape memory alloy member when energized; and a spring which is supported by the base member and which biases the movable member so as to be separated away from the base member, wherein the base member includes a spring support at a side of the operation base part, the movable member includes a flange-shaped push-up part which is opposed to an upper surface of the spring support, and the spring is interposed between the spring support and the flange-shaped push-up part.

2. The drive device according to claim 1, wherein the spring includes a spring base part to be inserted into a guide hole opened at an end of the spring support, and a spring body supported by the spring base part which is curved so as to be formed in an arc shape that is projected toward the flange-shaped push-up part, and the guide hole is formed in the shape of an elongated hole groove.

3. The drive device according to claim 1, wherein the spring includes a spring body which has an end movably retained by the movable member and which is curved in the shape of an arc projected toward the spring support, and an arc-shaped top of the spring body is brought into contact with the upper surface of the spring support.

4. The drive device according to claim 1, comprising a bracket for allowing the base member to movably retain the movable member.

* * * * *